Dec. 15, 1925.  K. D. UMRATH  1,565,342

APPARATUS FOR SHELLING CRUSTACEA

Filed Nov. 14, 1924

Inventor.
Karl D. Umrath.
By John N Brunninger
Attorney.

Patented Dec. 15, 1925.

1,565,342

UNITED STATES PATENT OFFICE.

KARL D. UMRATH, OF ST. LOUIS, MISSOURI.

APPARATUS FOR SHELLING CRUSTACEA.

Application filed November 14, 1924. Serial No. 749,881.

*To all whom it may concern:*

Be it known that I, KARL D. UMRATH, a citizen of the United States, and residing at St. Louis, State of Missouri, have invented the new and useful Improvement in Apparatus for Shelling Crustacea, of which the following is a specification.

This invention relates to apparatus designed for the shelling of Crustacea, and more particularly for separating the meat from the body part thereof. This invention is an improvement over the apparatus described in my copending application Serial Number 704,132, filed April 4, 1924.

One of the objects of this invention is to provide an apparatus of the character described, whereby the shells may not only be quickly positioned for separation of the meat therefrom, but whereby the empty shells may be readily discarded.

Another object is to provide an apparatus of the character described which is simple in construction and operation, reliable in its action and economical to manufacture.

Further objects will appear from the detail description taken in connection with the accompanying drawing, in which.

Figure 1:
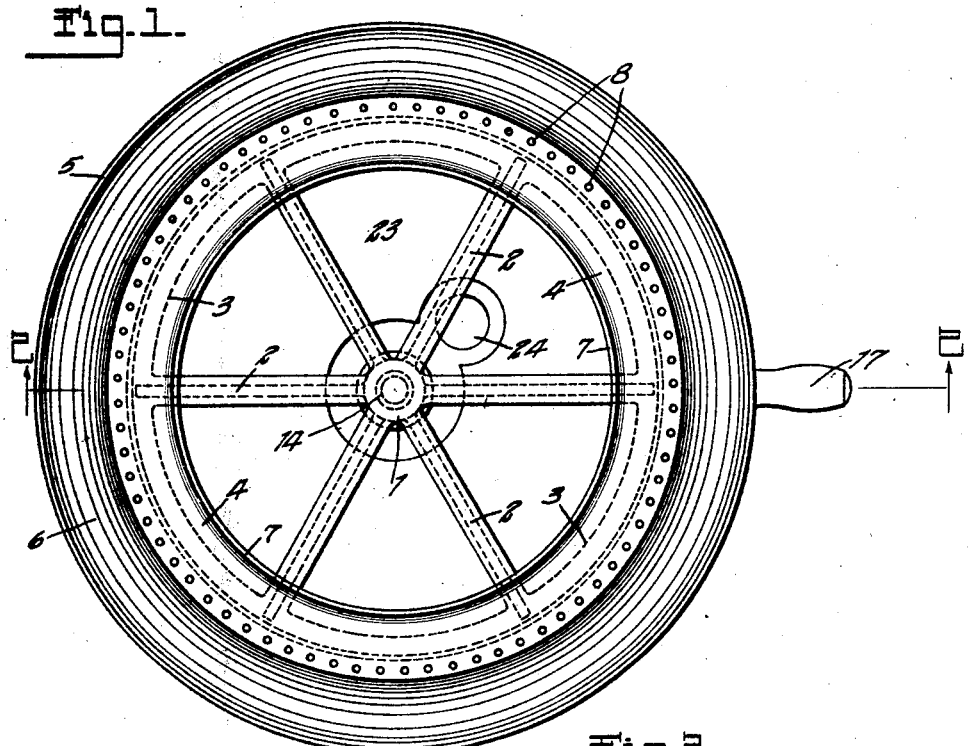
Figure 1 is a plan of an apparatus embodying this invention.
Figure 2:
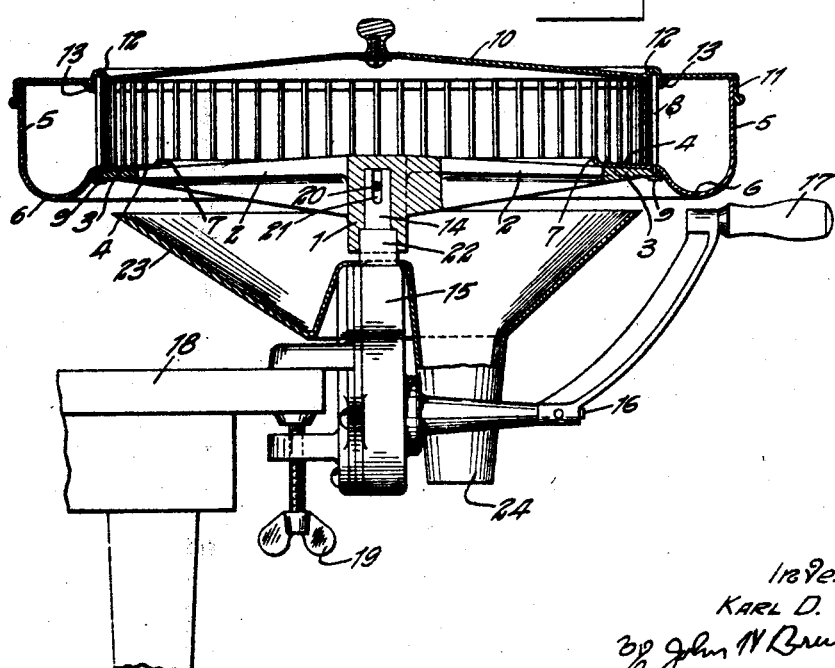
Figure 2 is a section on line 2—2, Figure 1.

Referring to the accompanying drawing, the apparatus comprises, generally stated, a pan consisting of a spider having a hub 1, arms 2 and a ring 3. Mounted on this spider is the pan proper, preferably made of sheet metal, and embodying a ledge 4, an outer wall 5, and a depression 6 providing an annular trough. The ledge 4 preferably slopes outwardly and downwardly, and has its inner edge turned up as shown at 7 to provide a shoulder. The pan thus has a center opening surrounded by a ledge.

Arranged within the pan and removed from the shoulder 7 is a grating consisting of a series of pins 8 which are fixed in the pan in any suitable manner as by reducing their lower ends so as to pass through the sheet metal part and the ring 3, the lower ends being riveted over as shown at 9. The pan is provided with a cover 10 which is also preferably of sheet metal and having an outer rim 11 taking over the wall 5. The top wall of the pan may also be formed to provide annular shoulders 12 and 13 taking over the ends of the pins 8 in order to support them against radial movement. The hub 1 is bored to take over a spindle 14 which is arranged vertically in a casing 15, in which is arranged suitable gearing connected with the shafts 16 provided with a handle 17, whereby the spindle may be rotated at high speed. The casing 15 is arranged to be mounted on any suitable support, such as a table 18, and secured in any suitable manner, as by means of a clamp 19. In order to key the hub to the spindle, this hub may be provided with a cross-pin 20 taking into a slot 21. Furthermore this spindle may have an enlarged part 22 providing a shoulder on which the hub may rest.

Arranged below the pan is a suitable receiver in the form of a hopper 23 which has an outlet 24 and which is mounted in any suitable manner as by securing it to the casing 15 in order to properly position the hopper beneath the pan and the central opening therein.

The operation of the apparatus will be readily understood by a reference to the drawings. This particular apparatus is designed particularly for separating the meat from the body of the Crustacea; accordingly the Crustacea, after being boiled or steamed, is denuded of its appendages and preferably also its back shell, and the body parts are cut in half so as to open the meat containing lobes. The halves are then assembled in the pan and placed on the ledge 4 with the open sides outwardly. This can be done very quickly after removal of the cover, either while the pan is in place or when it is removed and placed on a table. The downwardly sloping ledge permits the shells containing the meat to be readily positioned against the grating 8, while the shoulder 7 prevents them from shifting inwardly. After the cover has been replaced so as to support the upper ends of the partition pins 8, the loaded pan is rotated at a high speed until it revolves at about 7500 feet per minute. This will cause the meat to be thrown out of the shells by centrifugal force, the meat passing through the grating and collecting in the outer compartment between the grating and the wall 5 while the juice is collected in the gutter 6.

After the meat has been extracted from the shells which remain on the ledge 4, the cover is removed and these shells can then be readily discarded by pushing them over the shoulder 7 when they can drop through the central opening. This can be accomplished by simply pushing the shells inwardly so that the apparatus will be free of all shells and fibrous matter remaining inside of the grating 8. If this is done while the pan is in place, they will fall between the arms 2 and into the hopper and can be collected in any suitable receptacle placed below the outlet 24. The removal of the shells can, however, also be accomplished by simply lifting the pan structure from the spindle and placing it on any suitable support. The meat outside of the grating can then be readily removed in any suitable manner as by spooning or scraping. However, after the shells have been removed, the pan can be inverted so as to deposit the empty contents in any suitable receptacle since the pan is at this time free of the shells.

It will, therefore, be seen that this invention accomplishes its objects. A device is provided whereby the meat may not only be quickly separated from the shells, but the shells may also be readily discarded so as to leave the meat in the pan freed from shells and fibrous matter. The device is simple in construction and exceedingly economical to manufacture. It will be understood, of course, that the spindle 14 and the pan thereon may be driven by power in any suitable manner, a suitable motor being provided for that purpose.

It is obvious that various changes may be made in details of construction without departing from the spirit of this invention; it is, therefore, to be understood that this invention is not to be limited to the specific details shown and described.

Having thus described the invention, what is claimed is:

1. An apparatus for shelling Crustacea comprising, a pan adapted and mounted for rotation on its axis at high speed, means for retaining the shells in order to cause the meat to be thrown therefrom into said pan, and means whereby the shells may be discarded through the bottom of said pan.

2. An apparatus for shelling Crustacea comprising, a pan adapted and mounted for rotation on its axis at high speed, means for retaining the shells in order to cause the meat to be thrown therefrom into said pan, the bottom of said pan being open whereby the shells may be discarded therethrough.

3. An apparatus for shelling Crustacea comprising, a pan adapted and mounted for rotation on its axis at high speed and having a center opening surrounded by an annular ledge, and means for retaining the shells on said ledge in order to cause the meat to be thrown therefrom into said pan while the shells are discardable through the open center.

4. An apparatus for shelling Crustacea comprising, a pan adapted and mounted for rotation on its axis at high speed and having a downwardly and radially outwardly sloping annular ledge, and means for retaining the shells on said ledge in order to cause the meat to be thrown therefrom into said pan.

5. An apparatus for shelling Crustacea comprising, a pan adapted and mounted for rotation on its axis at high speed and having a center opening surrounded by an annular ledge which has an inside shoulder, and means for retaining the shells on said ledge in order to cause the meat to be thrown therefrom into said pan while the shells are discardable through the open center.

6. An apparatus for shelling Crustacea comprising, a spider carrying a pan adapted for rotation on its axis at high speed and having a center opening surrounded by an annular ledge, and means for retaining the shells in order to cause the meat to be thrown therefrom into said pan while the shells are discardable through the open center.

7. An apparatus for shelling Crustacea comprising, a pan adapted and mounted for rotation on its axis at a high speed and having means spaced inwardly from its rim for retaining the shells in order to cause the meat to be thrown therefrom into the rim of said pan, and means whereby the shells may be discarded through the bottom of said pan.

8. An apparatus for shelling Crustacea comprising, a pan adapted and mounted for rotation on its axis at high speed and having a grating spaced inwardly from its rim, the center of the pan being open to provide an annular ledge inside of said grating, whereby the shells may be discarded through the open center.

9. An apparatus for shelling Crustacea comprising, a spider carrying a pan adapted for rotation on its axis at high speed and having a grating spaced inwardly from its rim, the center of the pan being open to provide an annular ledge inside of said grating whereby the shells may be discarded therethrough.

10. An apparatus for shelling Crustacea comprising, a frame a pan thereon adapted and mounted for rotation on its axis at high speed, means for retaining the shells in order to cause the meat to be thrown therefrom into said pan, means whereby the shells may be discarded through the bottom of said pan, and means on said frame for receiving the discarded shells.

11. An apparatus for shelling Crustacea comprising, a frame a pan thereon adapted and mounted for rotation on its axis at high speed, means for retaining the shells in order to cause the meat to be thrown therefrom into said pan, the bottom of said pan being open, and a hopper on said frame below said pan.

12. An apparatus for shelling Crustacea comprising, a pan mounted for rotation on its axis at high speed, grating elements rising from the bottom of said pan, and a cover having a formed shoulder taking over said grating elements and adapted to support the same against outward movement.

In testimony whereof I affix my signature this 5th day of November, 1924.

KARL D. UMRATH.